United States Patent [19]

Eckels

[11] 4,054,125
[45] Oct. 18, 1977

[54] SOLAR HEATING WINDOW COVER

[76] Inventor: Robert E. Eckels, 2101 Youngfield St., Golden, Colo. 80401

[21] Appl. No.: 646,269

[22] Filed: Jan. 2, 1976

[51] Int. Cl.² .................................................. F24J 3/02
[52] U.S. Cl. .................... 126/270; 237/1 A; 350/167
[58] Field of Search ............... 126/270, 271; 237/1 A; 350/167

[56] References Cited

U.S. PATENT DOCUMENTS

| | | | |
|---|---|---|---|
| 1,093,498 | 4/1914 | Thring | 126/271 |
| 3,491,237 | 1/1970 | Tillett | 350/167 |
| 3,960,135 | 6/1976 | Angilletta | 237/1 A |
| 3,990,635 | 11/1976 | Restle et al. | 126/270 |

OTHER PUBLICATIONS

Fuschillo, N., "Semi-Transparent Solar Collector Window Systems," Solar Energy, vol. 17, pp. 159-165, Pergamon Press 1975.

*Primary Examiner*—Kenneth W. Sprague
*Assistant Examiner*—James C. Yeung

[57] ABSTRACT

A dark colored absorbing substrate covered with monolayer of solar radiation, transparent spheres, absorbs solar radiation for heating an air column formed between drapery material and the substrate mounted inside of a transparent window. In one form, a drapery material forms with the substrate a series of tubes for naturally or forcibly circulating warm air through the tubes when the substrate is heated by solar radiation. In another form, a eutectic salt in the tubes stores heat by transending to a higher energy state, so as to subsequently radiate heat on returning to a lower energy state. Reflecting cover means, selectively mountable in front of the substrate, reflects solar radiation back through the transparent window when heating is not required.

8 Claims, 23 Drawing Figures

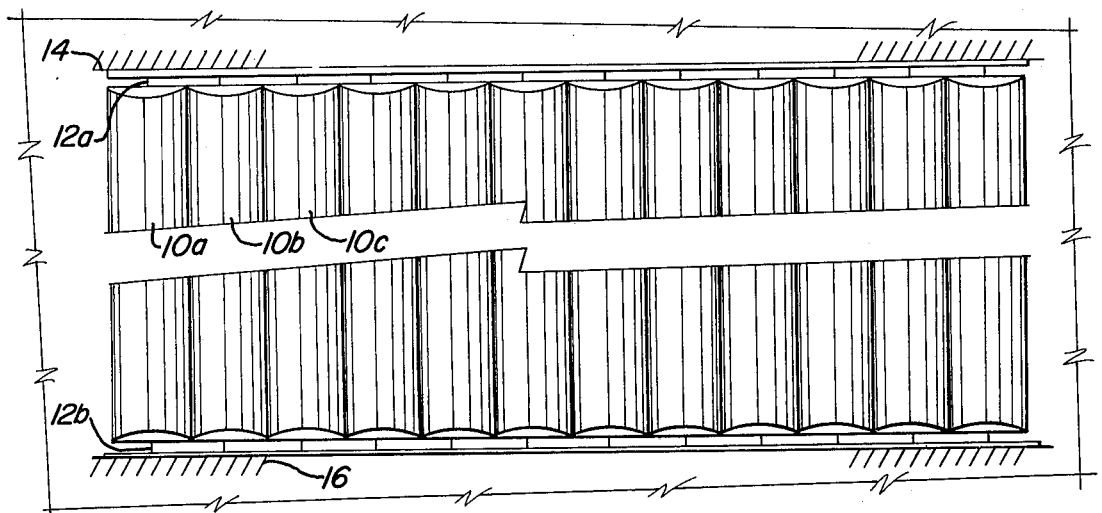
Fig_1
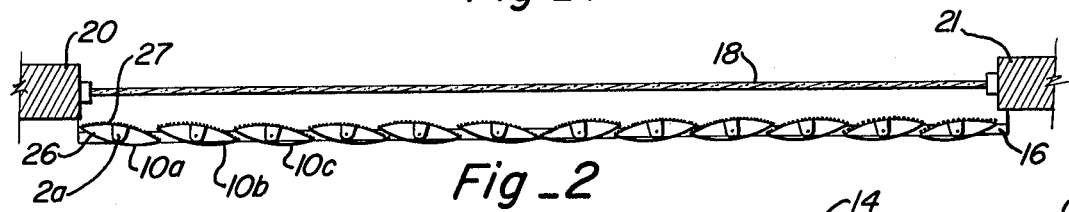
Fig_2
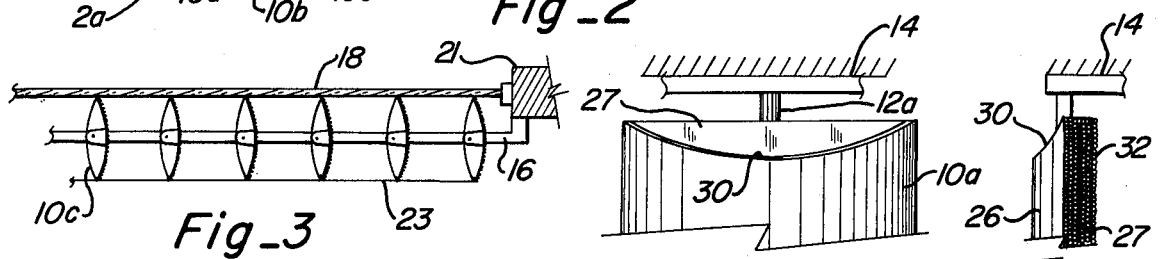
Fig_3
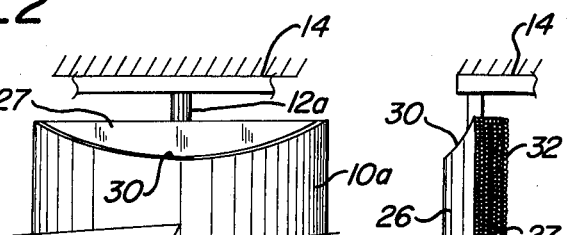
Fig_4    Fig_5
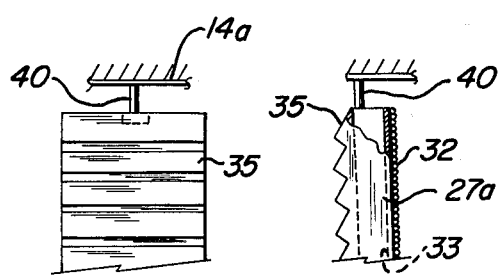
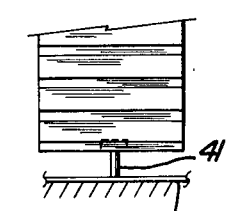
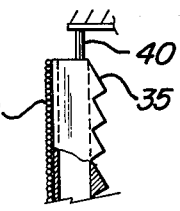
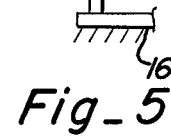
Fig_6    Fig_7    Fig_8

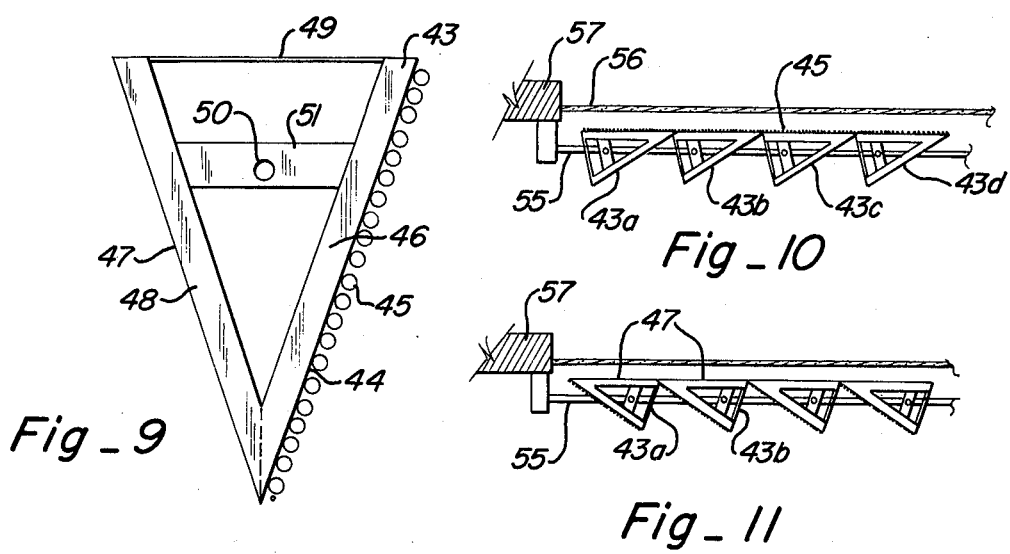
Fig_9
Fig_10
Fig_11
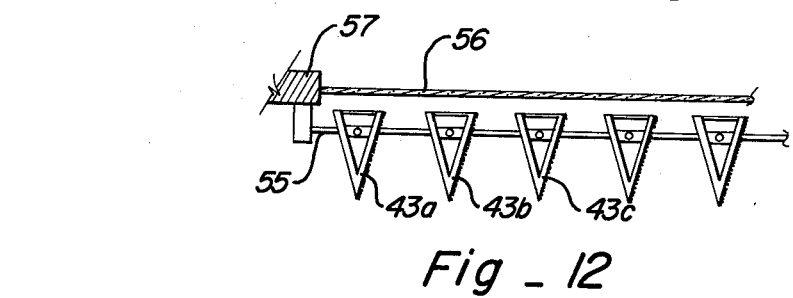
Fig_12
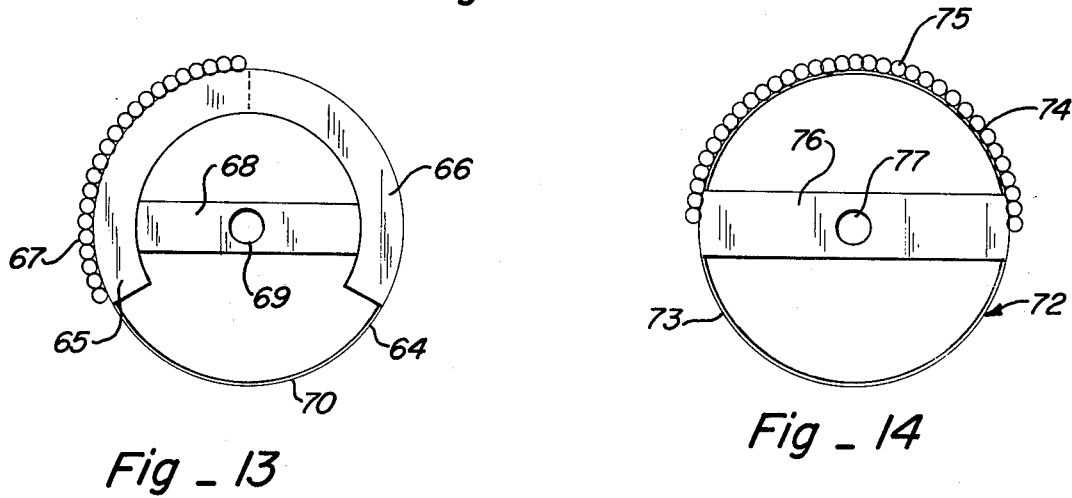
Fig_13
Fig_14
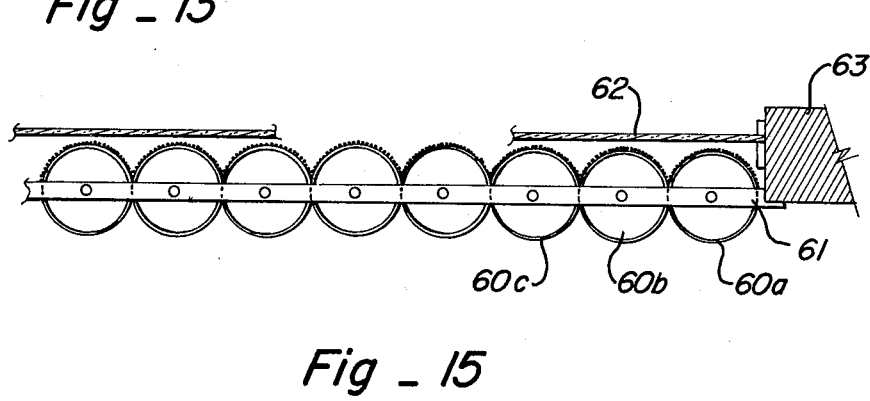
Fig_15

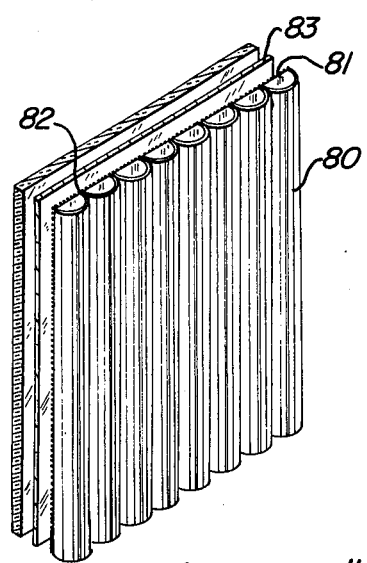
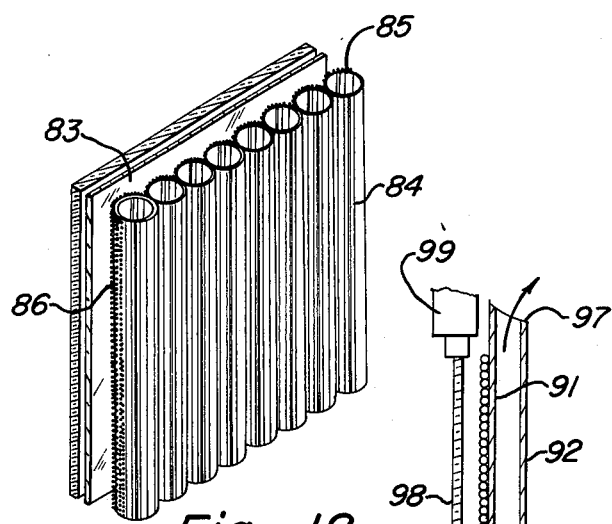
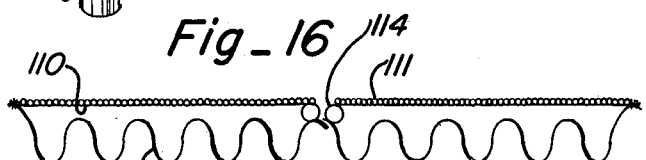
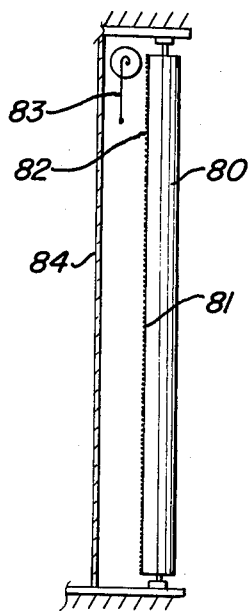
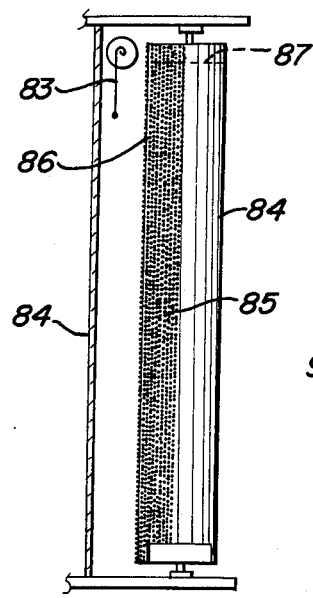
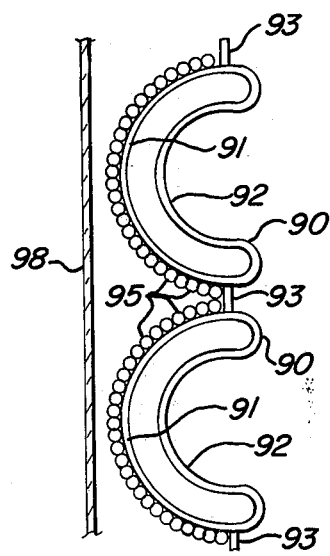
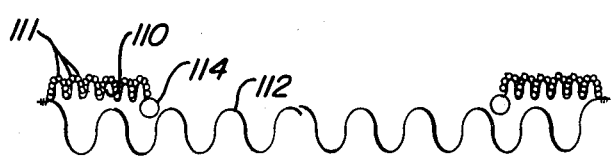

SOLAR HEATING WINDOW COVER

This invention relates to solar heating of closed spaces having solar radiation transparent windows and specifically, to heat collecting drapery; folding or sliding shutters; vertical, hollow, rotatable blinds, etc. There is provided an inexpensive means for collecting, transferring, storing and using heat from a solar source transmitted through a window in a building.

In my copending application, U.S. patent application Ser. No. 556,807, filed Mar. 10, 1975, for SOLAR HEAT COLLECTOR, there is described a solar heating drapery arranged for closing internally of a window to pick up solar radiation passing through the window. The drapery material is formed so as to provide a series of hollow, open ended tubes on the room side of the window mounted on a heat absorbing material adjacent the window. Solar heat is collected to heat the tubes and a chimney effect circulates the air through the tubes. The bottom and the top openings of the tubes must be sufficiently open into the room in which the drapery is mounted to accommodate incoming air at the lower level and to exhaust warm air at the upper level.

The pending application above identified describes a solar collecting and heating surface comprising a monolayer of radiation transparent spheres, for focusing solar radiation, and the substrate surface, usually black. These spheres pick up radiation from generally any angle of solar radiation, and may be mounted horizontally, vertically or at an angle, relative to the radiation from the sun in its seasonal, as well as daily travels. The spheres provide a focusing effect of radiation on the substrate, to accumulate the suns rays from a wide range of angles relative to the absorbing or substrate surface. This generally increases the overall absorption of available sun's radiation on the substrate, and, also, increases the temperature of the substrate. The focusing effect produces hot spots which are considerably higher in temperature than direct impingement of the rays on the surface. The arcuate surfaces of the spheres reduce the reflection since a substantial portion of the impingement surface area is at or near a right angle to solar radiation with the substrate whether angled, vertical or horizontal.

In most homes and in many office buildings, the windows are provided with coverings which may be opened or closed at the desires of the occupants. In most such installations, the window coverings are made decorative for fitting in the motif of interior appointments. Obviously, such window covering carries an expenditure which may be rather small to rather expensive in order to accomplish the effect desired. It is, therefore, an expenditure accompanying almost every window.

Numerous types of solar radiation absorbers have been heretofore proposed, but most use an absorber or collector on the exterior of a building for heating a transfer medium which may be gas, air or a liquid. This, of course, requires circulating means for the transfer medium, and normally storage means for the heat for use at a later time. One disadvantage of such systems is the high cost of installation, particularly on existing buildings. Generally, a considerable amount of remodelling must be done to accommodate the various systems, and considerable hardware is necessary that is not found in buildings without such systems.

Included among the objects and advantages of the present invention is to provide an effective and economical means for using solar energy to heat an enclosed volume.

Another object of the invention is to provide window covering means which utilizes solar heating on an economical and effective basis to residences, people occupied spaces having windows particularly facing east, south, or west.

Another object of the invention is to provide a window covering having a solar heating capacity in place of normally used drapes, curtains, etc. and still provide privacy, decoration, and light.

Yet another object of the invention is to provide a solar heating window covering having heat storage capacity means for use at a time when solar heating is not available.

An additional object of the invention is to provide a solar heated wall which is arranged for either natural air movement or for forced air movement to provide heating for an enclosed space.

These and other objects and advantages of the invention may be readily ascertained by referring to the following description and appended illustrations in which:

FIG. 1 is a side elevational view of one form of window covering for producing solar heat over a window;

FIG. 2 is a top plan view of the device of FIG. 1;

FIG. 3 is a slightly enlarged detailed view of one form of control means for the device of FIG. 1;

FIG. 4 is an enlarged detail view of the mounting ends of one of the slats of the device in FIG. 1;

FIG. 5 is a detailed view of one form of slat utilizing enhancement spheres for the absorbing surface of the device of FIG. 1;

FIG. 6 is a side elevational view of a modified form of a solar heating window covering according to the invention;

FIG. 7 is an end elevational view of the device of FIG. 6 in an enterior heat radiating mode;

FIG. 8 is a side elevational view of the device of FIG. 6 in an exterior heat absorbing mode;

FIGS. 9, 10, 11 and 12 are detailed views of a modified form of window collector having a triangular cross-sectional shape;

FIG. 13 is a schematic sectional view of a circular vertical tube for heating, radiating, reflecting and storing heat from solar radiation providing window covering for the window;

FIG. 14 is a modified view of a circular tube for heating or reflecting heat from a window;

FIG. 15 is a schematic, top plan view of a window covering providing a heating wall;

FIGS. 16 and 17 show generally schematic detail views in perspective of drapery arrangement for providing solar heating and reflector means when heating is not desired;

FIG. 18 is a side, generally schematic, elevation of a tubular element arranged at a window with reflecting means for shutting off solar radiation to the tubular means;

FIG. 19 is a side, generally schematic view of a different form of tube similar to that to FIG. 18;

FIG. 20 is a detailed view of a modified shape of solar collector for a window;

FIG. 21 is a side elevational cross-sectional view, generally schematic, of a drapery material with a heat absorption surface arranged at a window.

FIG. 22 is a schematic plan view of modified form of drapery, using the present invention, in heating configuration; and FIG. 23 is a schematic plan view of the device of FIG. 22 in non-heating configuration.

In one simple form, the invention may be a solar heating curtain which has fabric material back to back with an absorbing substrate, exteriorly covered with a monolayer of transparent spheres which, when drawn shut over a window, is arranged to cover the window and provide at least one air column which may be heated by the substrate. Such an arrangement is for providing additional heat to conventional heating systems in a building. In other forms, individual, tubular-type members are arranged to form a curtain or a covering for a window and providing generally the same concept.

As shown in FIGS. 1-5, a window covering includes a plurality of individual members, 10a, 10b, 10c, etc., each mounted on a rotatable axis 12a at the top, and 12b at the bottom with the same axial arrangement for all of the tubes of the series. The upper shafts for each of the tubes is mounted in an upper mount or track arrangement 14 and the lower shafts being mounted in a lower mount or track arrangement 16 so that all of the tubes are held in position to pivot from a window closure position shown in FIGS. 1 and 2 to an open position shown in FIG. 3. The individual elements are mounted on the support members 14 and 16 in front of a transparent window pane 18 supported between window jams 20 and 21. All the elements of the series may be rotated in unison by means of a rod 23, shown in FIG. 3 attached to the ends of the tubular members. The general construction of the tubular members is shown in FIGS. 4 and 5, wherein the tube element 10a includes a front surface 26 of arcuate configuration and a rear surface 27, also, of an arcuate configuration. The front and back sections of the tubes may be secured together along both edges and the sections held apart in tube shape in any covenient manner. The lower opening of the tubular member 10a includes a cutaway portion 29 providing an air entrance space between it and a floor or other supporting member on which the track 16 rests. The upper end of the tube includes a cutaway front section 30 which, also, provides an opening between it and the supporting member for the track 14. These openings permit the flow of air into and out of the tubular member. The arcuate surface 27 has on its window exposed side a monolayer of transparent spheres 32 which are secured to the surface by means of adhesive or the like to provide the accumulation and focusing effect of sun to solar radiation as defined above. The spheres may be clear, low iron glaze, clear synthetic resin, etc., all of which are transparent to solar radiation and generally untinted. The surface 27, which is considered the substrate, is preferably of a dark color so that it will absorb the rays passing through the spheres and is thereby heated. The heated substrate 27, in turn, heats the air inside the tube and as the air heats, a chimney effect is provided for the movement of the air through the tube from the bottom out the top. Natural convection provides a high rate of air movement giving circulation in the room. Depending upon the location of the window and the type of substrate, a temperature rise in the air generally is in a range from five to above about 50 degrees, with the higher temperatures being found in windows facing south.

The system just described is a vertical shutter system and depending upon the construction of the individual, tubular elements may be stationary or made to be drawn across the window and stacked at the sides of the windows. As shown, the elements may be rotated to cover the window to provide limited visual access through the window or completely drawn from across the window for full access. The room side of the tubes may be made decorative to complement the motive of the room appointment, however, they may be made reflective so that the units may be rotated completely around to reflect the solar radiation back out of the window where additional heating in the room is not desired.

A variation in the vertical tubular elements is shown in FIGS. 6-8 where the elements are composed of sawtooth, inner panels 35 mounted on the external substrate where absorption panel 27a is of generally arcuate or straight configuration. Each tubular member may be mounted on pivot pins 40 and 41 which, in turn, are mounted on tracks 14a and 16a. By having the upper surface of each serration black and the lower surface reflecting, with the reflective surface of a lesser width than the black heat absorbing surface, radiation of heat is provided from the black surface. With the serrated heat radiator side facing the room, heat from the hollow tube is transferred into the room as well as the circulation of air through the tube. When turned around, as shown in FIG. 7, the curtain would be on a cooling cycle. A tubular opening 33, passing through the element, provides for the passage of air through the unit. The individual member includes storage area for a eutectic salt so that heat may be stored by melting the salt. By providing a low melting eutectic salt or material, the units may be used on a cooling "storage" cycle by turning the heat absorber inwardly at night. The balance of the cooling use cycle anticipates turning the cooling section roomward during the hot day and lowering a heat reflective screen, such as 83 of FIG. 16, between the heat absorbing material or section and the solar source. This permits a natural downward convection of air flow through the unit warming the storage salts while cooling the air.

A variation of the individual tubular units is shown in FIGS. 9-12 each being a triangular shaped tubular member 43, which includes a black substrate 44 covered with a monolayer of transparent spheres 45 and a hollow chamber 46 extending along the length and width of the substrate surface 44 filled with an eutectic salt melting at from 80° to 120° F., providing the heat storage. The tube, also, includes a radiating surface 47 which covers a container 48 extending along the length of the tube which may be filled with an eutectic salt which melts at 30°-70° F., and is arranged for suitable cooling storage. The two angled sides are closed by a reflective surface 49 completing the tubular member. The tubular member may be mounted on an axis 50 supported by a cross support member 51, both ends being provided with a cross member and the axis. As shown in FIG. 10, a series of the triangular tubes 43a, 43b, 43c, etc. are mounted on a track 55 in front of a window 56 mounted in a framework 57. In this configuration, the transparent spheres 45 are mounted on the substrate are faced in the window facing position for absorption. In this position, the chamber containing the eutectic salt stores heat by melting the salt and this, in turn, heats the air column in the tube so that there is a flow of air up the column for immediately heating the room. In the configuration shown in FIG. 11, a cooling cycle wherein the curtain is turned to this configuration at night so that a cooling storage may be obtained crystallizing the eutectic salt at a lower temperature. When this salt is cooled, it crystalizes and during the day when it is desired to cool the room, the eutectic salt absorbs room heat melting the salt and cooling the room. As shown in FIG. 12, the units are rotated into a window visual configuration for admitting light and for viewing through the window. Here the remainder of the cooling cycle anticipates reflection of considerable radiation by the surfaces 49 of the unit. This may, also, incorporate a reflection curtain for greater radiation reflection during the room cooling.

A heating and cooling wall may be formed as shown in FIG. 15, wherein a plurality of circular tubes 60a, 60b, 60c, etc. are mounted on a track 61 adjacent a window 62 mounted in a frame 63. In one form, the circular tubes, shown at FIG. 13, includes an outer shell 64 having an inner compartment 65 at one side covering about 120° arc and another compartment 66 at the opposite side covering about 120° of arc. The exterior of the compartment 65 is covered by a monolayer of the transmitting spheres 67 for providing concentration of solar radiation on the surface of the container 65 which, preferably, is coated with a absorbing material. Each tube has an upper and lower cross support member 68 and an upper and lower pivot pin 69 providing rotation for the tube. The surface of the container 66 may be blackened for radiation of heat therefrom into the room. The remainder of the surface 70 may be made reflective and thereby provide a three-way element. The unit is mounted in series, shown in FIG. 15, and is rotatable with the absorption area adjacent the window to heat an eutectic salt in the container 65 and to similtaneously heat the air in the tube for circulation of the air in the room enclosure in which it is mounted. In a manner similar to that described above, a low melting eutectic salt may be filled in the container 66 and it may be rotated to the window for night absorption of "cold" to provide cooling during the heat of the day as the eutectic salt melts. When it is not desired to have any absorbtion or radiation, the tubes may be rotated so that the reflective surfaces are toward the window for reflecting in coming solar radiation back through the window.

A simple tubular member, shown in FIG. 14, includes a shell 72 provided with a generally hemisphere reflective surface 73, and an absorbing surface 74 over which is mounted a series of transparent spheres 75. The tube is hollow and is provided with a lateral brace member 76 at each end and a pivot pin 77 for mounting the unit adjacent a window and providing pivoting of the tube. In this case, the tube is arranged to pivot the absorbing surface against the window for heating the air in the tube or for reflecting radiation through the window by the reflecting surface 73 being rotated to the window.

A drapery material 80, FIG. 16, is pleated with the pleats sewn to a black substrate 81 to provide a series of tubes which, in open position, have one straight side formed of the absorptive material with the reflective spheres, and a decorative drapery material pleated on the opposite side. The absorptive material is covered with the transparent spheres 82, at least in the area of the window, and is arranged to heat the tubes as described above. A reflective curtain 83 may be provided as a rollup curtain between a window 84 and the drapery. As explained above, the tubes may be mounted on tracks in front of the window 85. When mounted on drapery rods, the material is arranged to be pulled into closed position over the windows or opened by being bunched at the edges of the windows. As shown in FIG. 17, the tubes should be short of the ceiling and floor to provide passage of air through the tubes. The pleats may be formed along vertical lines as shown, or may be made at an angle to the vertical for a longer path of some of the tubes.

In a similar manner, the drapery tubes may be made round as shown in FIGS. 18 and 19 by means of circular shaped flat springs secured to the fabric at the top of the curtain. Also, partially circular, flat springs may be used for tubes of different shapes. In this situation the drapery material 84 is again sewn to the absorption material 85 which is covered by means of transparent spheres 86. A reflective sheet 83 is arranged for mounting on a roller so that it may be pulled down in front of the window to prevent radiation into the space when it is not desired. The flat springs 87 are made of thin spring metal which, when released, will form circles or may be crushed as when the drape is opened so as to stack the squeezed tubes along the sides of the window.

As shown in FIGS. 20 and 21, the spherical focusing elements may be placed on vertical tubes and collectively form a curtain for the window. The tubular members may be made in arcuate configurations which are hollow, including in inner arcuate surface 92 spaced from an outer arcuate surface 91 joined together to provide a partial, annular passage. Each of the tubes may be joined to its neighbors by means of connecting members 93 joined to the surfaces and spacing the tubes apart. The tubular members may be formed with flat spring members of the annular configuration so that when released they expand to the half annular passage configuration and may be pulled together for bunching the material. The outer edge of the back surface 91 should be black and absorptive and covered with a monolayer 95 of spherical transparent members for the heating, as explained above. The bottom edge 96 and the top edge 97 of each of the tubes is biased inwardly to leave an opening for the passage of air into and out of the tube. Again, for heating with this type of curtain, the curtains are drawn during the time of sunshine so that any solar radiation passing through the window impinges upon the black absorptive surface through the spheres and it is focused on the black surface to heat the surface and the air in the tube. On heating the air in the tube, it expands and passes out the top of the tube and cold air from the bottom passes upwardly into the tube replacing the withdrawn air in a natural convection flow.

The tubes of the drapery explained above are shown with natural convection whereby air in the tube is heated and a chimney effect causes a natural circulation of the air upwardly through the tubes. The circulation may be reversed, however, by the use of small blowers at the top or bottom of the tubes to blow or pull the air from the ceiling downwardly through the tubes. This may be by a manifold with openings over each tube, with the drape closed, and a single blower may provide a forced circulation downwardly through the tubes. Hot or warm air is thus expelled adjacent the floor of the building providing circulation of the warm air in the building. With the natural circulation a passive heater is, however, provided without the use of external energy, the circulation of air being provided by the heating of air in tubes by solar radiation only.

One form of a drapery type window closure is shown in FIGS. 22 and 23 where a movable fabric or other flexible dark backing 110 has a monolayer of radiation transmitting spheres 111 secured to the surface facing the window. This covering has a pleated drape 112 in front of the backing, and drawable to the side of the window. The backing and drapery are split so as to cover one half of the window. An end member 114 secured to the backing 110 and is arranged to close the opening between the end of the backing and the drape. Both drapery and backing may be pulled sidewise of the window. This arrangement permits the solar absorber to be withdrawn from the window (either totally or partially) when some or all the solar heating is not necessary, leaving the drapery closed, partially or fully open. The end 114, which may be a roll of cardboard or the like, maintains the space between the backing and drapery closed (the backing may be sewn to the drape along the edge away from the window center) and permits the chimney effect of the heated space, even with the solar collector partially closed. The inner drape may be shear, allowing in some light, but may be reflective to reflect solar radiation. If it is reflective there is little effect on the absorption and heating the air column. It does permit variations in the heat output of the window covering.

The concept of the window covering may be applied to the exterior wall of a building, where the column of air in the tubes, by either forced or natural draft may be used as a heating medium. This arrangement may be used so that heating may be accomplished or stopped as desired.

The double layer covering over a window, also, provides insulation, as at night when no solar radiation is available. The absorber substrate may provide insulation by itself, but it has increased insulation value with the addition of the inner or drapery covering.

When the term "eutectic salt" is used herein, it is intended to include other phase charge material useful for heat absorption and/or storage.

What is claimed is:

1. A room window covering for utilizing solar radiation, comprising
   a. solar radiation collector means arranged to be positioned adjacent a window and cover at least a portion of the window for absorption of solar radiation passing the window, said collector means including a flexible thin, dark colored fabric-like substrate and a monolayer of solar radiation transparent spheres secured to the window facing surface thereof,
   b. an overlaying pleated drapery material window covering means adjacent said collector means on the side opposite said spheres, and positioned to provide a plurality of tubular type vertical passages therebetween for passage of air, and
   c. said overlaying covering means being provided with an upper and a lower room opening for each tubular type passage permitting the passage of air to and from different elevations in the room.

2. A room window covering according to claim 1 wherein said collector means is formed in two portions arranged to be combined to cover the window.

3. A room window covering according to claim 1 wherein said pleats are secured to said substrate forming said tubular passages.

4. A room window covering according to claim 1 wherein said pleats are not secured and the folds are closely adjacent to said substrate.

5. A room window covering according to claim 4 wherein said substrate and said drapery material are independently mounted and independently openable and closable.

6. A room window covering according to claim 5 wherein means are provided at the inner ends of each portion of substrate and drapery material effectively closing the gap between the two.

7. A room window covering according to claim 1 wherein air is forced through said tubular type passages by blower means.

8. A method of heating an enclosed space having a window in position to be contacted by solar radiation, comprising
   a. placing a generally planar fabric-like, dark absorber of solar radiation having secured on the window side a mono-layer of focusing spheres on the enclosed space side of the window and adjacent said window,
   b. placing a pleated fabric on the enclosed space side of said absorber and closely adjacent thereto, so as to form a plurality of tubular passages for an effective air passage therebetween, and
   c. subjecting said absorber to solar radiation so as to heat air in said air passage for circulation in said space.

* * * * *